3,691,018
DIAGNOSTIC METHOD FOR PERIODONTAL DISEASE

Thomas F. McNamara, North Caldwell, N.J., and Richard A. Winer, Marblehead, Mass., assignors to Warner-Lambert Company, Morris Plains, N.J.
No Drawing. Filed Oct. 28, 1970, Ser. No. 84,901
Int. Cl. C12k 1/04
U.S. Cl. 195—103.5 R    3 Claims

ABSTRACT OF THE DISCLOSURE

A diagnostic method for the early detection of periodontal disease by determining the presence of β-D-galactosidase in crevicular fluids.

---

The best means for preventing needless pain and possible loss of teeth is the early detection of incipient periodontal disease and undertaking a course of treatment suitable therefor.

We have discovered that periodontal disease may be diagnosed before there is any visible evidence thereof by careful sampling of the crevicular fluid around a tooth and the testing of it for the presence of β-D-galactosidase. The presence of this enzyme has been found to be indicative of periodontal disease. Further experimentation has demonstrated that this method can be used to determine the severity of the disease.

The fluid which must be sampled is not that of the oral cavity generally, since β-D-galactosidase may be present there without having any relation to periodontal disease. The fluid which indicates periodontal disease when it contains these enzymes is the crevicular fluid which is found in the gingival sulcus, which is the space formed between the enamel/cementum of the tooth and the adjacent gum tissue. Care is taken to dry swab the area around the sulcus to remove any other fluids incidentally present in the mouth thereby insuring that any enzyme found will have come only from the crevicular fluids in the gingival sulcus.

A particular difficulty which had to be overcome in order to carry out the diagnostic tests of the present invention was to find a means for sampling the fluids from the gingival sulcus which would retain them without further dilution, while testing for β-D-galactosidase activity. This unvarying concentration of crevicular fluid further permits an estimation of the severity of periodontal disease based on the intensity of color developed when the enzyme present is contacted with a substrate of 6-bromo-2 naphthyl β-D-galactopyranoside then after a suitable period of incubation the lysed product of the substrate is coupled with a diazonium salt and the resulting color rated with a standard for intensity.

It is an object of the present invention to provide a means and method for early detection of periodontal disease.

Another object is to provide a method and means for differentiating between β-D-galactosidase generated in mammalian tissue and that which is produced as a result of bacteria acting upon matter outside of said tissue.

A further object of this invention is to provide a preferred means of accomplishing these objectives in the form of a self-contained system of test strips to measure qualitatively and quantitatively the presence of β-D-galactosidase.

Another object of this invention is to teach a method for interpreting the significance of the results obtained.

Other objects and advantages of this invention will become apparent from the following detailed description and accompanying drawing.

We have discovered that there is a demonstrable correlation between the presence in crevicular fluid in the gingival sulcus of the enzyme β-D-galactosidase and periodontal disease. The sources of this enzyme in crevicular fluid are two. It may be produced as a result of changes in the gingival tissue itself which marks the first stage of periodontal disease. As it progresses, the gingival seal to tooth is loosened allowing foreign particles to collect in this space or pocket. More enzyme is produced by bacterial action on this material.

It has been found that optimum enzyme activity requires two pH's in testing for β-D-galactosidase. Enzymes produced as a result of changes in mammalian tissue were optimally active at pH 5 while those produced by bacterial action had their greatest activity at pH 7.5. The significance of this is that mammalian tissue enzyme marks the possible onset of the first phase of periodontal disease, depending on its severity while enzyme bacterially produced in the gingival sulcus represent a worsening second phase of periodontal disease.

The amount of crevicular fluid available to the tip of a sampling means is necessarily small. A method of taking such a sample has now been discovered which prevents any substantial dilution of it so that even when rather small, its concentration is maintained such that when contacted with a substrate, the product of the enzyme action is retained in amounts reflecting the amount of β-D-galactosidase existing in the crevicular fluids. A strip formed from a nylon Millipore® filter having a pore size of one micron is suitable for this purpose.

What we have done is to use a material for sampling which is porous but the pores of which are not interconnected and which are of nearly uniform size. The fluids fill the pore spaces and tend not to migrate out of them during subsequent treatment. This maintains the amount of enzyme which is to be determined relatively constant. The substrate which is acted upon by the enzyme available at the pore openings appears to leave the lysed products at the pore opening which when treated further with a diazonium salt develops a color.

It has been determined empirically that four degrees of enzyme activity scaled 0, 1, 2 or 3 are sufficient to establish the existence of periodontal disease. Both types of enzyme are tested for: one sample buffered to pH 5 and the other buffered to pH 7.5 and each incubated with the substrate at 37° C. for about an hour.

The porous strip which has been incubated with a suitable substrate is removed from contact with the substrate and would be post-coupled to give a color reaction by contacting it with a diazonium salt. If no color developed the test was rated zero; slight intensity, one; moderate intensity, two; and deep intensity, three. Clinical tests have been conducted using this technique and the results obtained indicate a positive correlation exists between the presence of periodontal disease and the presence of enzyme at pH 5.0 and pH 7.5. Inflammation due to periodontal disease was shown to exist when the sum of the combined enzyme activity of tissue and bacterially produced enzyme was three or more (correlation coefficient 0.77). It should be noted that only when tissue generated enzyme which is active at pH 5.0 is found to be present is the level of activity of bacterially generated enzyme measured at pH 7.5.

The following examples are given by way of illustration and not limitation.

EXAMPLE 1

Strips of 1μ millipore nylon filter paper obtained from Millipore® Filter Corporation, Bedford, Mass., are cut into strips 2 x 10 mm. one end of which is pointed. Two stock solutions are prepared as follows:

(1) 15 mg. 6-bromo-2-naphthyl-β-D-galactopyranoside.
(2) 10 ml. methyl alcohol.

Dissolve (1) and (2) together over a period of about 1 hour.

(3) To this, 15 ml. of distilled water is added with agitation.
(4) Adjust the pH of one solution to 5 with about 20 ml. of 0.1 M acetate buffer and the pH of the other to 7.5 with about 20 ml. of 0.1 M Veronal buffer.
(5) Add 5.8 g. NaCl or KCl.
(6) Dilute up to 100 cc. with distilled water.

The diazonium salt suitable for coupling reaction is prepared by dissolving 10 mg. of diazo blue salt in 10 cc. distilled water and about 20–30 mg. $NaHCO_3$ or suitable material to give a pH of about 7.5–8.

The substrate solution and the diazonium salt are impregnated into the Millipore® strip in separate zones and dried. The unitary test strip then has a pointed sampling end above which is a zone of substrate and separately above that a zone of diazonium salt. The strips may be color coded or otherwise made distinguishable as that buffered to pH 5 and the other to pH 7.5.

EXAMPLE 2

One strip of each type is used per tooth to be examined. The area to be sampled is isolated with cotton rolls and the gingival mucosa wiped dry with gauze. The pH 5 substrate strip is held with a flattened forceps and the point is gently inserted into the gingival sulcus for about five seconds and then withdrawn. This procedure is repeated using the pH 7.5 strip.

The strips are placed in individual test tubes pointed end first and water added sufficient to just cover the strip to just above the substrate level. They are then incubated separately at 37° C. for two hours to develop optimal enzyme activity. The strip is removed to another test tube and immersed to over the diazonium salt and gently agitated for about one minute. The strips are then rinsed in distilled water and allowed to dry after which they are evaluated for color density.

The following results are typical of those on which the present invention is based:

TABLE I.—RELATIONSHIP OF ENZYME SCORES TO GINGIVAL DISEASE

|  | pH 5.0 | pH 7.5 |
|---|---|---|
| Normal | 0 | 0 |
|  | 1 | 0 |
| Normal leading to disease | 2 | 0 |
|  | 1 | 1 |
|  | 3 | 0 |
|  | 2 | 1 |
| Disease present | 1 | 2 |
|  | 2 | 2 |
|  | 3 | 1 |
|  | 2 | 3 |
| Disease (severe) | 3 | 2 |
|  | 3 | 3 |

While the preferred embodiments of the invention have been described herein, it is to be understood that various changes and modifications may be made without departing from the spirit and scope of the invention as defined by the appended claims.

What is claimed is:

1. A method for the early diagnosis of periodontal disease which comprises taking a sample of the crevicular fluid from the gingival sulcus, contacting a portion of said fluid with a substrate of 6-bromo-2-naphthyl-β-D-galactopyranoside buffered to give pH 5, separately contacting another portion of said fluid with the same substrate buffered to give pH 7.5, incubating, post-coupling the incubated substrate products with a diazonium salt and evaluating the color developed in each instance.

2. A method as set forth in claim 1 wherein the crevicular fluids are sampled by placing an edge of a Millipore® filter having 1 micron pores into the gingival sulcus absorbing the fluid into individual, discrete pores, contacting the fluids retained in said pore with the substrate, incubating for about two hours at 37° C., and contacting the strip with a solution of diazonium salt.

3. A pair of unitary diagnostic test strips comprising nylon Millipore® filter paper having a pore size of about 1 micron, one zone of which is impregnated with a substrate of 6 - bromo - 2 - naphthyl - β - D - galactopyranoside and a buffer which will give pH 5 in solution and a second zone which is impregnated with a diazonium salt buffered to give a pH of about 7.5 to 8 and the second strip identical to the first except that the first zone contains a buffer to give a pH of 7.5.

References Cited

UNITED STATES PATENTS 3,607,093   9/1971   Stone _____ 195—103.5 R

OTHER REFERENCES

Chemical Abstracts, 48:10076c (1955).
Chemical Abstracts, 60:13596h (1964).
Cohen et al.: "Jour. Biol. Chem.," 195:239–249 (1952).

A. LOUIS MONACELL, Primary Examiner

M. D. HENSLEY, Assistant Examiner

U.S. Cl. X.R.

23—253 TP; 195—99